US012687501B2

(12) United States Patent (10) Patent No.: US 12,687,501 B2
Fandem et al. (45) Date of Patent: Jul. 21, 2026

(54) TESTING TUBULAR MEMBERS

(71) Applicant: Saudi Arabian Oil Company, Dhahran (SA)

(72) Inventors: Qasem A. Fandem, Al Qatif (SA);
Fahad T. Al Mahashir, Dhahran (SA);
Abdullah S. Al Haidan, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 144 days.

(21) Appl. No.: 18/601,697

(22) Filed: Mar. 11, 2024

(65) Prior Publication Data

US 2025/0283836 A1 Sep. 11, 2025

(51) Int. Cl.
| | |
|---|---|
| *G01N 21/954* | (2006.01) |
| *B25J 19/02* | (2006.01) |
| *G01B 11/06* | (2006.01) |
| *G01B 11/12* | (2006.01) |
| *G01N 21/952* | (2006.01) |
| *G01N 35/00* | (2006.01) |

(52) U.S. Cl.
CPC .......... *G01N 21/954* (2013.01); *B25J 19/022* (2013.01); *G01B 11/06* (2013.01); *G01B 11/12* (2013.01); *G01N 21/952* (2013.01); *G01N 35/00584* (2013.01); *G01N 35/0099* (2013.01)

(58) Field of Classification Search
CPC ............ B25J 19/022; G01N 35/00584; G01N 35/0099; G01N 21/954; G01N 21/952; G01B 11/06; G01B 11/12
See application file for complete search history.

(56) References Cited

U.S. PATENT DOCUMENTS

| | | | |
|---|---|---|---|
| 4,354,379 A | 10/1982 | Miner | |
| 6,289,600 B1 * | 9/2001 | Watts ..................... | G01B 11/08 |
| | | | 33/542 |
| 6,996,914 B1 * | 2/2006 | Istre ....................... | G01B 11/12 |
| | | | 33/645 |
| 9,418,431 B2 | 8/2016 | Brumovsky | |
| 2014/0243896 A1 * | 8/2014 | Assell ................... | A61F 2/4405 |
| | | | 606/279 |
| 2014/0254896 A1 * | 9/2014 | Zhou .................. | G06Q 20/3829 |
| | | | 705/16 |

(Continued)

FOREIGN PATENT DOCUMENTS

EP       3093611       11/2016

*Primary Examiner* — Jason Holloway
*Assistant Examiner* — Alexander R. Morford
(74) *Attorney, Agent, or Firm* — Fish & Richardson P.C.

(57) ABSTRACT

An autonomous machine includes a body; a mobile base coupled to the body and configured to move the body between a plurality of locations; and at least one extendable appendage coupled to, and configured to extend from, the body. The at least one extendable appendage includes at least one laser sensor plate. The at least one laser sensor plate includes at least one laser emitter configured to move on the at least one laser sensor plate and emit a laser signal along a tubular member; and at least one laser receiver coupled to the at least one laser sensor plate and configured to receive a reflected laser signal along the tubular member. The emitted laser signal and the reflected laser signal is indicative of a quality of the tubular member.

30 Claims, 10 Drawing Sheets

(56)                References Cited

U.S. PATENT DOCUMENTS

| | | | | |
|---|---|---|---|---|
| 2015/0116728 A1* | 4/2015 | Lacome | .................. | G01B 11/00 |
| | | | | 356/601 |
| 2015/0148949 A1* | 5/2015 | Chin | ...................... | B25J 13/006 |
| | | | | 700/245 |
| 2021/0389257 A1* | 12/2021 | Liu | .......................... | G06N 3/08 |
| 2022/0155241 A1* | 5/2022 | Alnefaie | ................ | G01B 11/12 |

* cited by examiner

TESTING TUBULAR MEMBERS

TECHNICAL FIELD

The present disclosure describes systems and methods for testing tubular members and, more particularly, systems and methods for laser drift testing tubular members used in hydrocarbon and chemical piping networks with an autonomous machine.

BACKGROUND

Proper tubular members typically have circular or substantially circular cross-sections, with substantially equal wall thickness along a length of the tubular member. However, in some cases, a tubular member may have a cross-section that varies undesirably from circular or substantially circular along a length of the tubular member. Further, a tubular member may have a wall thickness that varies undesirably along a length of the tubular member. Use of such non-conforming tubular members can cause problems.

SUMMARY

In an example implementation, an autonomous machine includes a body; a mobile base coupled to the body and configured to move the body between a plurality of locations; and at least one extendable appendage coupled to, and configured to extend from, the body. The at least one extendable appendage includes at least one laser sensor plate. The at least one laser sensor plate includes at least one laser emitter configured to move on the at least one laser sensor plate and emit a laser signal along a tubular member; and at least one laser receiver coupled to the at least one laser sensor plate and configured to receive a reflected laser signal along the tubular member. The emitted laser signal and the reflected laser signal is indicative of a quality of the tubular member.

In an aspect combinable with the example implementation, the mobile base includes one or more tracks configured to move the body between the plurality of locations.

In another aspect combinable with one, some, or all of the previous aspects, the at least one sensor plate includes a plurality of tracks, and the at least one laser emitter and the at least one laser receiver are configured to ride on the plurality of tracks.

In another aspect combinable with one, some, or all of the previous aspects, the plurality of tracks include a first track positioned or formed at or near an outer circumference of the at least one sensor plate; and a second track positioned or formed to connect a first location of the first track, across the at least one sensor plate, to a second location of the first track.

In another aspect combinable with one, some, or all of the previous aspects, a length of the second track is a diameter of the at least one sensor plate.

Another aspect combinable with one, some, or all of the previous aspects further includes an electrical power system that includes at least one renewable power source coupled to the body and electrically coupled to the mobile base; and at least one charging port and electrically coupled to the mobile base and a battery coupled to the body.

Another aspect combinable with one, some, or all of the previous aspects further includes a control system coupled within the body and configured to perform operations including receiving an optical image of the tubular member from one or more optical sensors communicably coupled to the control system; based on the received optical image, controlling the mobile base to move the body to a first position of the plurality of positions, the first position located adjacent an open end of the tubular member; and operating the at least one extendable appendage to move the at least one sensor plate to the open end of the tubular member.

In another aspect combinable with one, some, or all of the previous aspects, the operations include subsequent to moving the at least one sensor plate to the open end of the tubular member, moving the at least one laser emitter around at least a portion of the at least one laser sensor plate while emitting the laser signal along the tubular member; moving the at least one laser receiver around at least the portion of the at least one laser sensor plate while emitting the laser signal along the tubular member to receive the reflected laser signal; and based on the emitted laser signal and the reflected laser signal, determining the quality of the tubular member.

In another aspect combinable with one, some, or all of the previous aspects, the operations include, while emitting the laser signal along the tubular member, operating the at least one extendable appendage to move the at least one sensor plate into and through at least a portion of the tubular member such that the reflected laser signal reflects from an inner radial surface of the tubular member.

In another aspect combinable with one, some, or all of the previous aspects, the quality of the tubular member includes at least one of a surface quality of the tubular member or a wall thickness of the tubular member.

In another example implementation, a tubular member testing system includes a plurality of tubular members, with each tubular member including an outer radial surface, an inner radial surface, a first open end, and a second open end; a laser reflector positionable at or adjacent the first open end of each tubular member; and an autonomous machine. The autonomous machine includes a body; a mobile base coupled to the body and configured to move the body between the second open ends of the plurality of tubular members; and at least one extendable appendage coupled to, and configured to extend from, the body, the at least one extendable appendage including at least one laser sensor plate. The at least one laser sensor plate includes at least one laser emitter configured to move on the at least one laser sensor plate and emit a laser signal along one of the inner radial surface or the outer radial surface of each tubular member; at least one laser receiver coupled to the at least one laser sensor plate and configured to receive a reflected laser signal from the laser reflector along the other of the inner radial surface of the outer radial surface of each tubular member; and a controller configured to perform operations including determining a quality of each tubular member based at least in part on the emitted laser signal and the reflected laser signal.

In an aspect combinable with the example implementation, the mobile base includes one or more tracks configured to move the body between the second open ends of the plurality of tubular members.

In another aspect combinable with one, some, or all of the previous aspects, the at least one sensor plate includes a plurality of tracks, and the at least one laser emitter and the at least one laser receiver are configured to ride on the plurality of tracks.

In another aspect combinable with one, some, or all of the previous aspects, the plurality of tracks includes a first track positioned or formed at or near an outer circumference of the at least one sensor plate; and a second track positioned or formed to connect a first location of the first track, across the at least one sensor plate, to a second location of the first track.

In another aspect combinable with one, some, or all of the previous aspects, a length of the second track is a diameter of the at least one sensor plate.

In another aspect combinable with one, some, or all of the previous aspects, the autonomous machine further includes an electrical power system that includes at least one renewable power source coupled to the body and electrically coupled to the mobile base; and at least one charging port and electrically coupled to the mobile base and a battery coupled to the body.

In another aspect combinable with one, some, or all of the previous aspects, the operations include receiving an optical image of a particular tubular member from one or more optical sensors communicably coupled to the control system; based on the received optical image, controlling the mobile base to move the body to the second open end of the particular tubular member; and operating the at least one extendable appendage to move the at least one sensor plate to the second open end of the particular tubular member.

In another aspect combinable with one, some, or all of the previous aspects, the operations include subsequent to moving the at least one sensor plate to the second open end of the particular tubular member, moving the at least one laser emitter around at least a portion of the at least one laser sensor plate while emitting the laser signal along the particular tubular member; and moving the at least one laser receiver around at least the portion of the at least one laser sensor plate while emitting the laser signal along the particular tubular member to receive the reflected laser signal.

In another aspect combinable with one, some, or all of the previous aspects, the operations include while emitting the laser signal along the particular tubular member, operating the at least one extendable appendage to move the at least one sensor plate into and through at least a portion of the particular tubular member such that the reflected laser signal reflects from the inner radial surface of the particular tubular member.

In another aspect combinable with one, some, or all of the previous aspects, the quality of the particular tubular member includes at least one of a surface quality of the particular tubular member or a wall thickness of the particular tubular member.

In another aspect combinable with one, some, or all of the previous aspects, the plurality of tubular members includes wellbore tubular members.

In another example implementation, a method for testing a tubular member includes activating an autonomous machine that includes a body; a mobile base coupled to the body; and at least one extendable appendage coupled to the body. The at least one extendable appendage includes at least one laser sensor plate that includes at least one laser emitter; and at least one laser receiver. The method includes moving the autonomous machine to an open end of a tubular member with the mobile base; operating the at least one laser emitter to emit a laser signal along the tubular member; receiving a reflected laser signal along the tubular member with the at least one laser receiver; and based on the emitted laser signal and the reflected laser signal, determining a quality of the tubular member.

In an aspect combinable with the example implementation, moving the autonomous machine includes moving the autonomous machine with one or more tracks on the mobile base.

Another aspect combinable with one, some, or all of the previous aspects further includes moving the at least one laser emitter and the at least one laser receiver on a plurality of tracks of the at least one sensor plate during emission of the laser signal and receipt of the reflected laser signal.

In another aspect combinable with one, some, or all of the previous aspects, moving the at least one laser emitter and the at least one laser receiver on the plurality of tracks includes at least one of moving the at least one laser emitter and the at least one laser receiver on a first track positioned or formed at or near an outer circumference of the at least one sensor plate; or moving the at least one laser emitter and the at least one laser receiver on a second track positioned or formed to connect a first location of the first track, across the at least one sensor plate, to a second location of the first track.

Another aspect combinable with one, some, or all of the previous aspects further includes providing electrical power to the mobile base with at least one of at least one renewable power source electrically coupled to the mobile base; or at least one battery electrically coupled to the mobile base.

Another aspect combinable with one, some, or all of the previous aspects further includes identifying an optical image of the tubular member from one or more optical sensors; based on the optical image, controlling the mobile base to move the body to a first position located adjacent the open end of the tubular member; and operating the at least one extendable appendage to move the at least one sensor plate to the open end of the tubular member.

Another aspect combinable with one, some, or all of the previous aspects further includes subsequent to moving the at least one sensor plate to the open end of the tubular member, moving the at least one laser emitter around at least a portion of the at least one laser sensor plate while emitting the laser signal along the tubular member; moving the at least one laser receiver around at least the portion of the at least one laser sensor plate while emitting the laser signal along the tubular member to receive the reflected laser signal; and based on the emitted laser signal and the reflected laser signal, determining the quality of the tubular member.

Another aspect combinable with one, some, or all of the previous aspects further includes, while emitting the laser signal along the tubular member, operating the at least one extendable appendage to move the at least one sensor plate into and through at least a portion of the tubular member such that the reflected laser signal reflects from an inner radial surface of the tubular member.

Another aspect combinable with one, some, or all of the previous aspects further includes scanning, with the one or more optical sensors, a code on the tubular member associated with one or more parameters of the tubular member; and displaying, on a visual display of the autonomous machine, at least one of: the code, or the one or more parameters of the tubular member.

In another aspect combinable with one, some, or all of the previous aspects, determining the quality of the tubular member includes determining the quality based on at least one of the one or more parameters of the tubular member.

In another aspect combinable with one, some, or all of the previous aspects, determining the quality of the tubular member includes determining at least one of a surface quality of the tubular member or a wall thickness of the tubular member.

Implementations of autonomous machines for laser drift testing of tubular members according to the present disclosure may also include one or more of the following features. For example, implementations according to the present disclosure can provide for a digital device or machine to automatically perform drift testing of a tubular member. As another example, implementations according to the present disclosure can verify marking traceability on large quantities of pipes and tubes relative to human verification. As a further example, implementations according to the present disclosure can independently perform dimensional and roundness checks of tubular members, as well as provide a level of quality assurance for the inner roundness of cylindrical objects.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
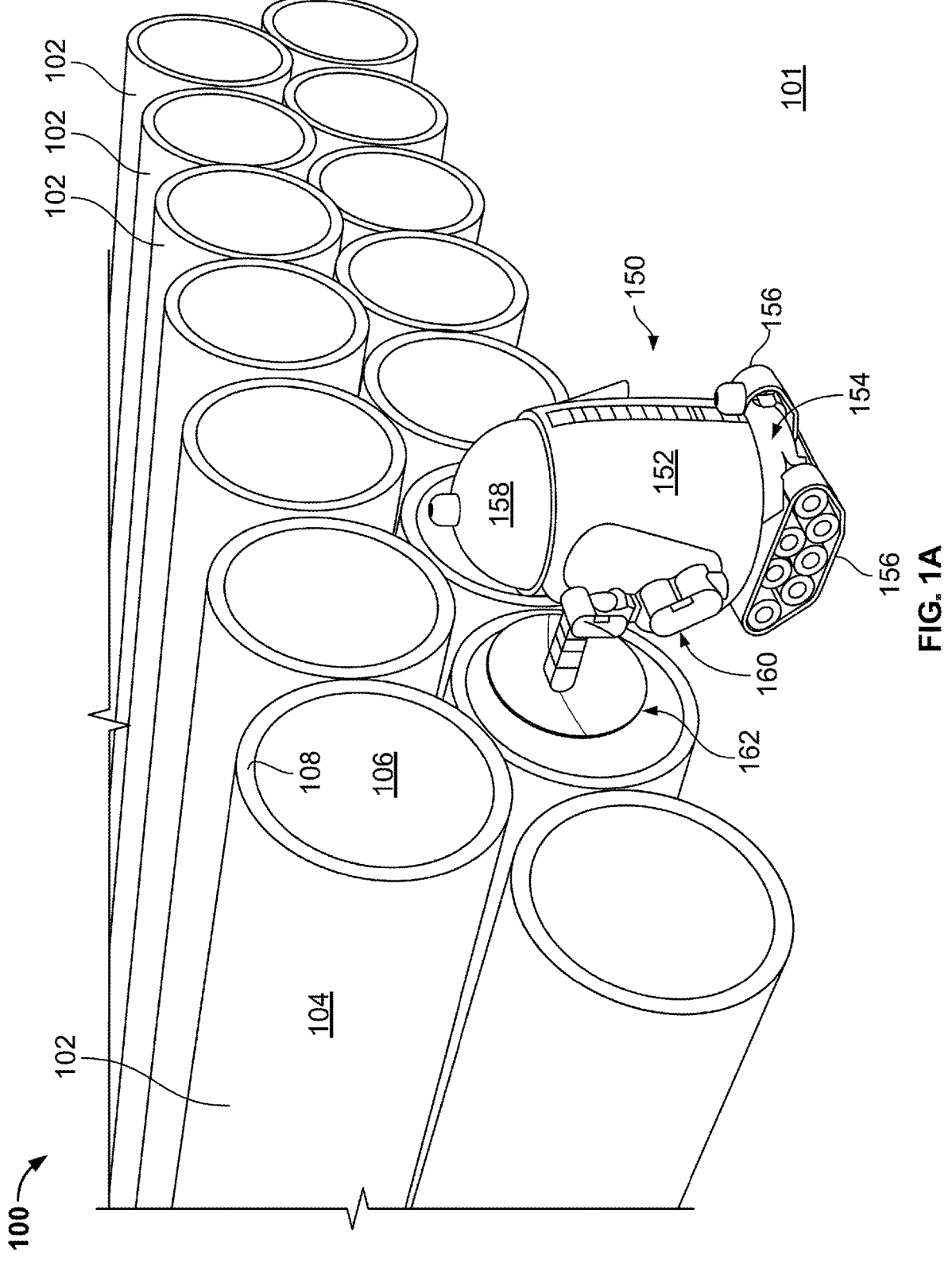
FIGS. 1A-1D are schematic diagrams of an example implementation of a tubular member testing system that includes an example implementation of an autonomous machine that performs laser drift testing of one or more tubular members according to the present disclosure.

The present disclosure describes example implementations of an autonomous machine that can automatically perform laser drift testing of one or more tubular members, such as wellbore casings, tubular joints, and other members to verify a quality of the tubular member, such as roundness, lack of defects, wall thickness, and otherwise. Example implementations of an autonomous machine, therefore, can autonomously and independently perform dimensional and roundness checks of tubular members to ensure that the members are free of dents, bends or flat areas that would prevent, for example, downhole tooling, smaller pipes, or other objects from passing therethrough. Example implementations of an autonomous machine can perform both qualitative and quantitative testing of the tubular members, as well as verify traceability markings on the tubular members to provide a level of quality assurance for the inner roundness of the tubular members during or after a manufacturing process.

FIGS. 1A-1D are schematic diagrams of an example implementation of a tubular member testing system 100 that includes an example implementation of an autonomous machine 150 that performs laser drift testing of one or more tubular members 102 according to the present disclosure. As illustrated, tubular members 102 can be arranged during or after a manufacturing process to be inspected and tested by the autonomous machine 150, which can move about and adjacent the tubular members 102 to autonomously perform laser drift testing. In the present disclosure, the autonomous machine 150 can perform the testing (and other operations) autonomously in that no direct human commands or intervention is needed during a testing (or other) process. Instead, the autonomous machine 150 can perform the testing according to algorithmic instructions that have been pre-programmed into a controller 158 in combination with environmental feedback received by the autonomous machine 150 during the testing (or other) process.

In the illustrated example, each tubular member 102 is formed with a circular or substantially circular cross-section (accounting for defects) with an inner radial surface 106 and an outer radial surface 104. Each tubular member 102 includes two open ends, including open end 108 and open end 109 (shown in FIGS. 3A and 3B). Tubular members 102 can be casing joints, production tubing joints, pipeline sections, or other pipes that can be used in hydrocarbon recovery and refining processes.

As shown in this example, the tubular member 102 are arranged for inspection in that open ends 108 are arranged for access by the autonomous machine 150. In this example implementation, the autonomous machine 150 takes the form of a modified humanoid robot with a body 152 to which a mobile base 154 is coupled. The mobile base 154 includes one or more (two in this example) tracks 156 that are operable to move the body 152 (based on control by the controller 158) with 360° movement to multiple locations to perform laser drift testing (or other operations) of the tubular members 102. Alternatively, other forms of traction devices besides the tracks 156, such as wheels, rollers, or even humanoid legs can be implemented in the mobile base 154 to move the autonomous machine 150 over a support surface 101 (on which the tubular members 102 also rest).

In this example, the autonomous machine 150 includes at least one extendable appendage 160 that is coupled to the body 152. As illustrated, the extendable appendage 160 comprises an extendable arm 160 comprised of multiple linkages that extend to move a laser sensor plate 162 (for example, a radially expandable laser sensor plate 162) connected to the arm 160 away from the body 152 for laser drift testing of the tubular members 102. As explained in more detail herein, the arm 160 can extend forward from the body 152 (toward a tubular member 102 as shown in FIG. 1A) so that the laser sensor plate 162 can be inserted through the open end 108 to perform laser testing of the inner radial surface 106 of the tubular member 102.

Figure 1B:
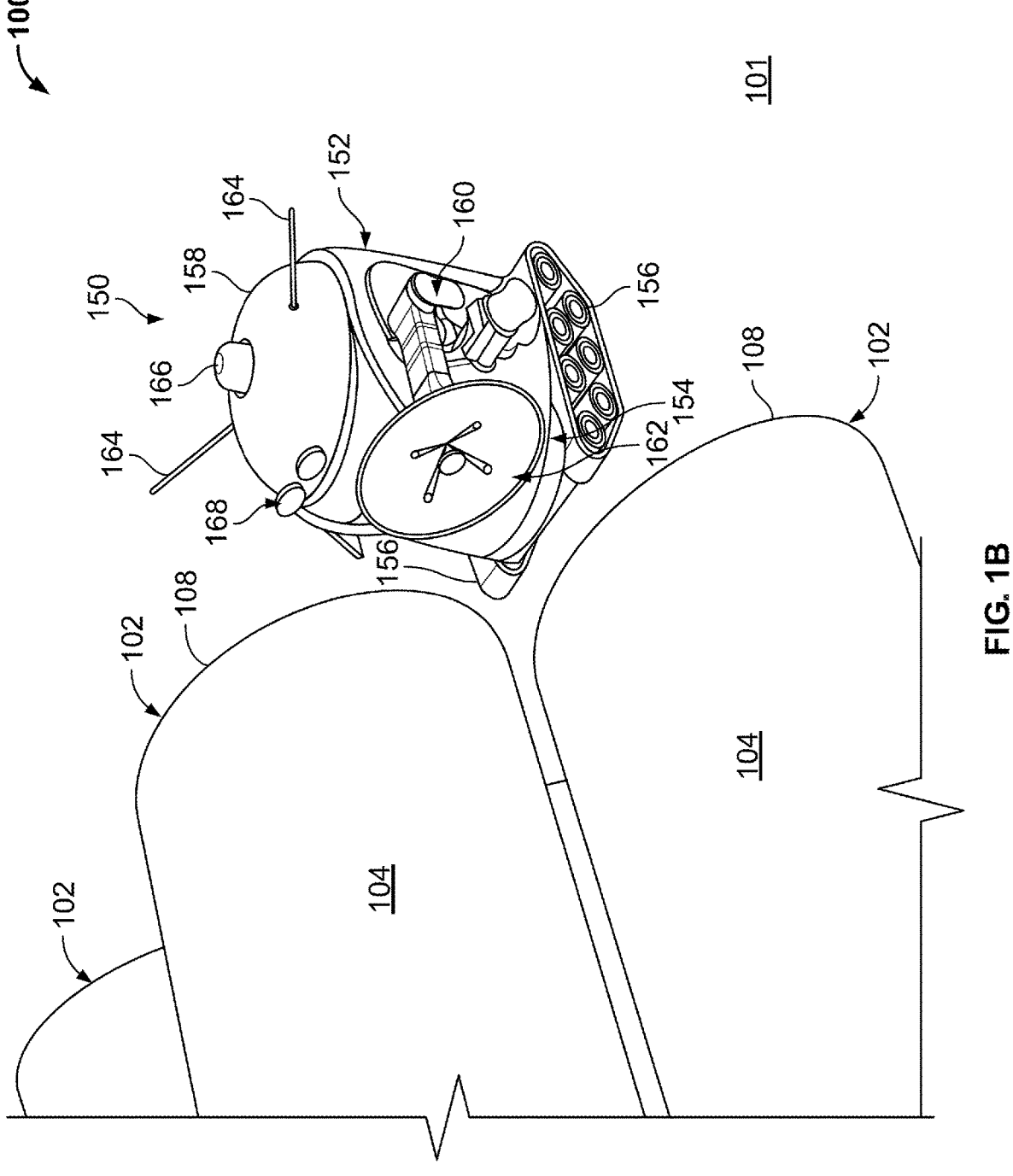
Figure 1C:
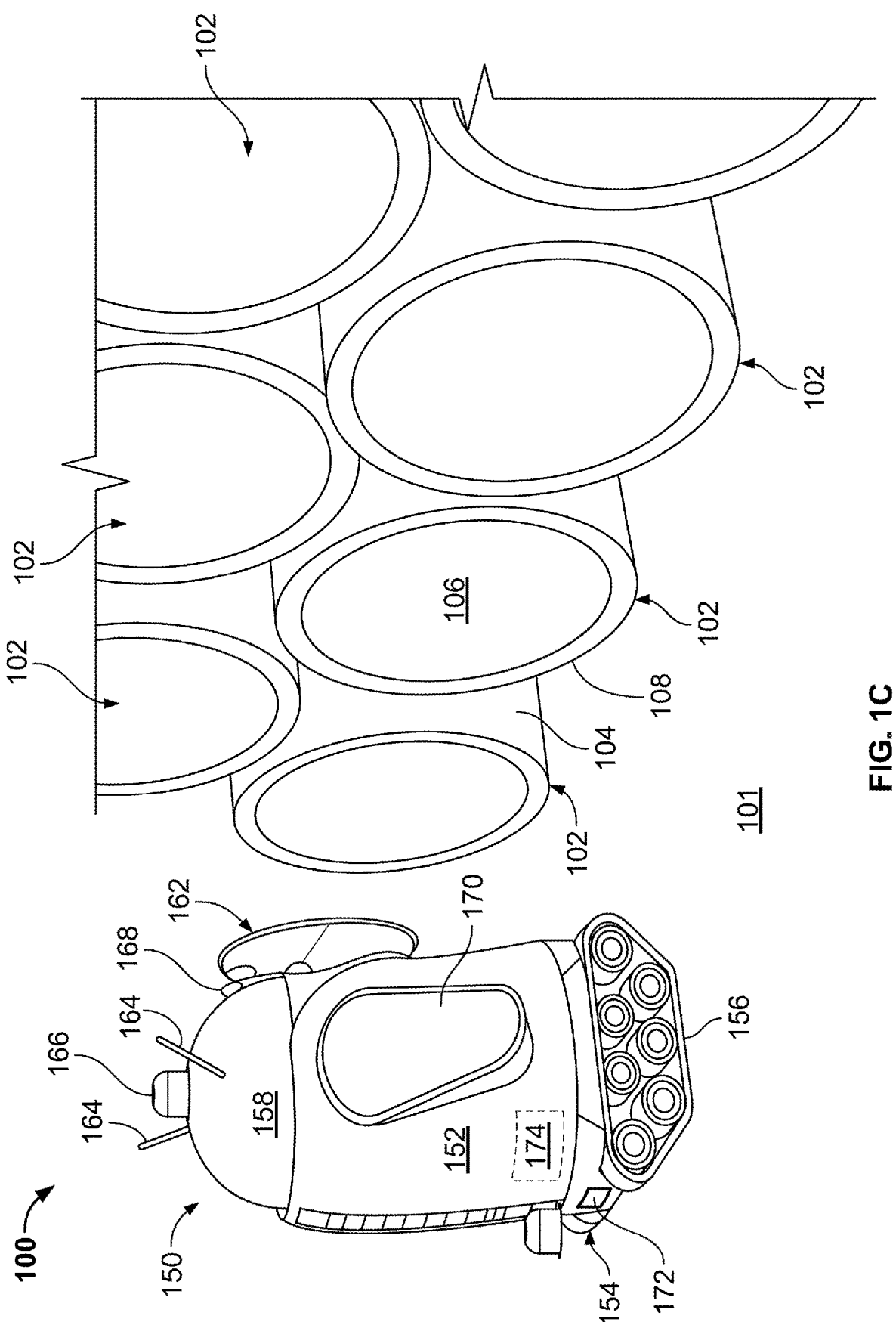
Figure 1D:
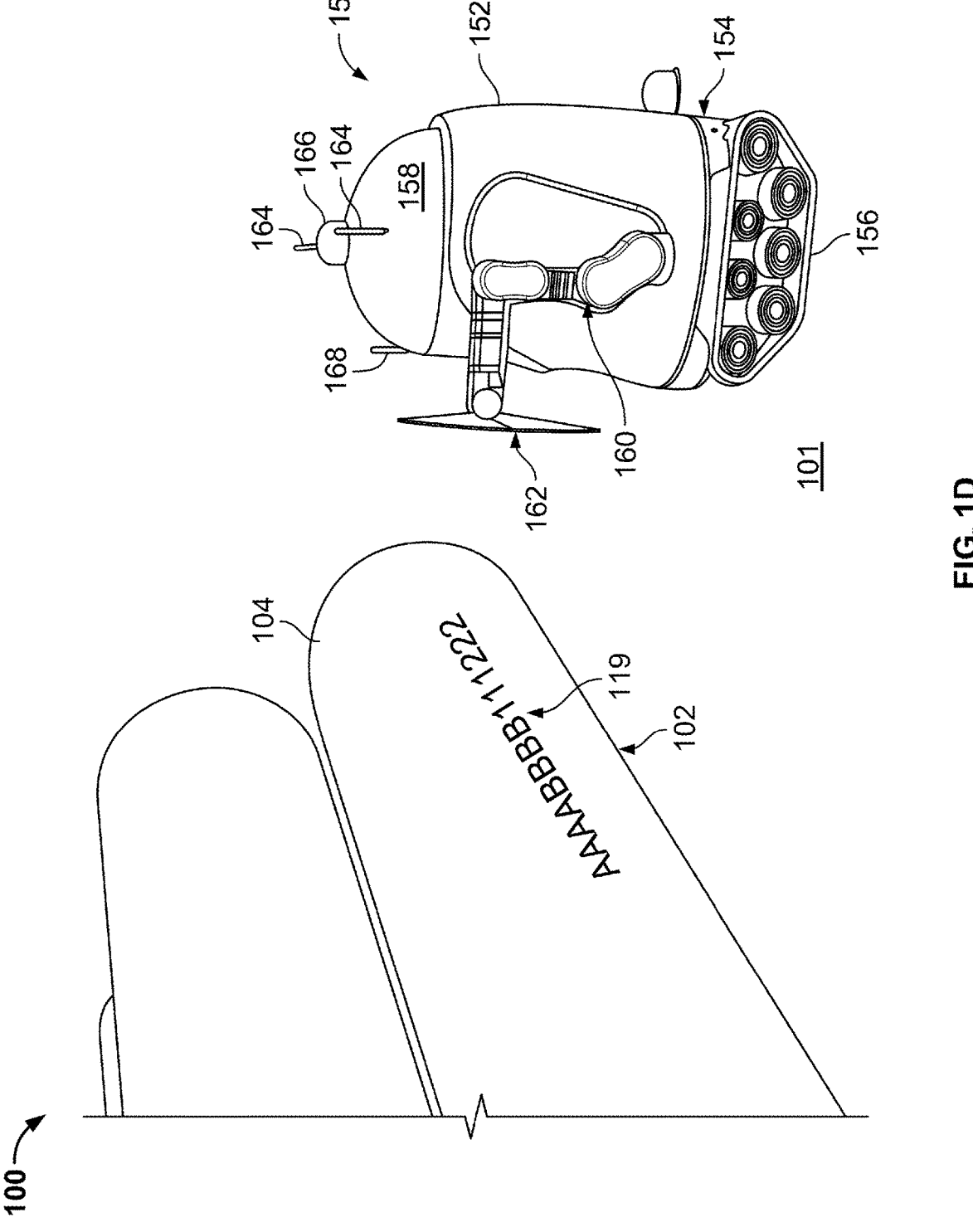

As further shown in FIGS. 1B-1D, one or more optical sensors 168 are positioned on the controller 158 to provide a visual input to the controller 158 of the environmental surroundings of the autonomous machine 150. In some aspects, the optical sensors 168 can be high definition or infrared cameras can provide an augmented reality that transfers scanned data into three-dimensional planes with internal patterns and indications that can be extracted into visual graphics by the controller 158. In addition, the optical sensors 168 can provide feedback of, for example, obstacles as well as positioning of the body 152 relative to the tubular members 102 to the controller 158. Such feedback can be used by the controller 158 to control movement of the autonomous machine 150 from one tubular member 102 to another tubular member 102 to perform the laser drift testing of multiple tubular members 102 in the testing system 100.

Communication antennae 164 (or a single antenna 164) can also be coupled to the controller 158 to provide two-way communication between the autonomous machine 150 and, for example, a human operator or remote monitoring system for the testing of the tubular members 102. For example, the two-way communication can include commands from a remote monitoring system to perform testing of particular tubular members 102, or movement commands for the autonomous machine 150, as well as data feedback from the autonomous machine 150 that includes, for instance, testing reporting and analysis of the tubular members 102 (for example, defects or other quality determinations). In some aspects, an operating light 166 can be illuminated when the autonomous machine 150 is in operation, such as moving or performing laser drift testing the tubular members 102.

As shown in more detail in FIG. 1C, the autonomous machine 150 can be powered by an electrical power assembly that include a renewable energy source 170 (such as a PV solar panel 170), a charging port 172, and one or more batteries 174 (for example, mounted in the body 152). In some aspects, the batteries 174 can provide electrical power to operate the autonomous machine 150, either alone or in combination with the solar panel 170 and charging port 172. For instance, the charging port 172 can be electrically coupled to a source of electrical power to charge the batteries 174 and/or provide electrical power to operate the autonomous machine 150. During periods of idleness, therefore, the autonomous machine 150 can be plugged into a charging station through the charging port 172.

The solar panel 170 can also be electrically coupled to the batteries 174 (and, in some aspects, other power consuming components of the autonomous machine 150 such as the controller 158 and arm 160). Thus, in some examples, the solar panel 170 can be electrically coupled to charge the batteries 174 and/or provide electrical power to operate the autonomous machine 150.

Turning to FIG. 1D, this figure illustrates an example operation in which the autonomous machine 150 scans (with the optical sensors 168) tubular member data 111 from a tubular member 102. For example, as tubular members 102 are manufactured, the tubular member data 111 can be stamped or otherwise printed on, for example, the outer radial surface 104. The tubular member data 111 can include, for example, information regarding a size, material, pressure rating, temperature rating, manufacture origin, or other traceability information of the tubular member 102. In some aspects, certain data, such as material, pressure rating, tubular type, can be used in an analysis along with laser drift testing data to determine if the tubular member 102 sufficiently meets standard requirements of quality based on the testing. The tubular data 111 can be analyzed against predefined uploaded criteria to determine, for example, the acceptance (or rejection) of the tubular member 102.

Figure 2A:
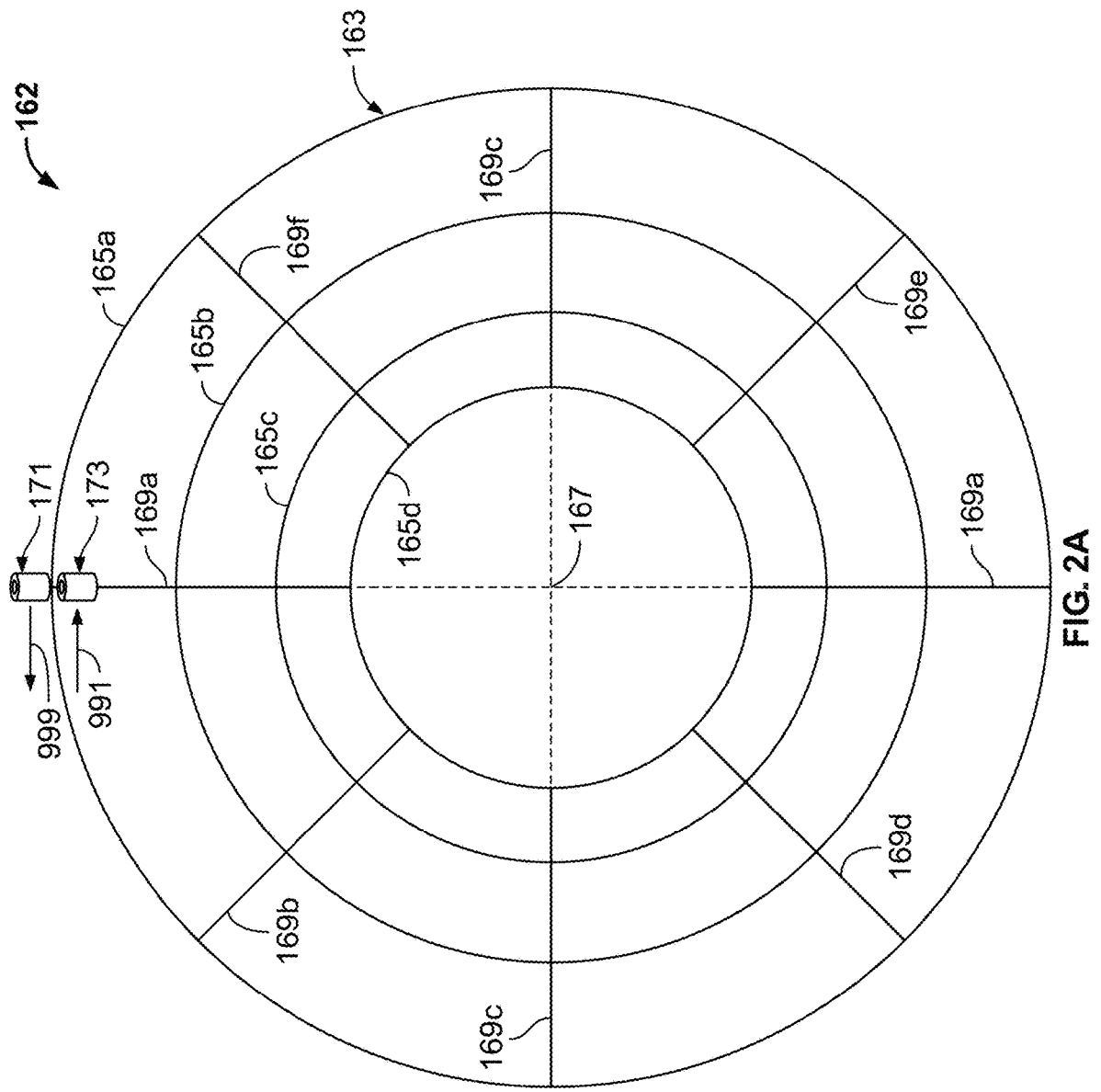
FIG. 2A is a schematic diagram of an expandable laser sensor plate to fit different pipe diameters of an example implementation of an autonomous machine that performs laser drift testing of one or more tubular members according to the present disclosure.

FIG. 2A is a schematic diagram of the expandable laser sensor plate 162 of an example implementation of the autonomous machine 150 that performs laser drift testing of one or more tubular members 102 (with varying diameters) according to the present disclosure. As described, the laser sensor plate 162 is coupled to an end of the arm 160, which can extend from the body 152 of the autonomous machine 150 to place the laser sensor plate 162 at the open end 108 of a tubular member 102 to perform laser drift testing. FIG. 2A shows a front view (or head on view) of the laser sensor plate 162. In this example, the laser sensor plate 162 is round or substantially round (for example, to fit within the tubular member 102). However, other example implementations of the laser sensor plate 162 can have a polygonal shape as appropriate.

Generally, the laser sensor plate 162 includes at least one laser emitter-receiver 171 operable to emit a laser signal 999, and receive a reflected laser signal 991, onto or along an outer diameter of a tubular member 102. The laser sensor plate 162 also includes at least one laser emitter-receiver 173 operable to emit a laser signal 999, and receive a reflected laser signal 991, onto or along an inner diameter of a tubular member 102. By movement of the autonomous machine 150, the arm 160, and/or the laser sensor plate 162 (which can rotate or tilt on the arm 160), precise laser positioning can be achieved on the fixed surface of the tubular member 102. Emitted laser signals 999 are transmitted by the laser emitter-receivers 171 and 173 along an outer diameter and inner diameter, respectively, of a length of the tubular member 102. Reflected laser signals 991 are received by the laser emitter-receivers 171 and 173. The reflected laser signals 991 can indicate, through deflection of the signals 991 relative to the emitted signals 999, a dent, defect, or out of tolerance dimension of the tubular member 102. The deflection of the signals 991 relative to the emitted signals 999 can also indicate an abnormal condition, location, and type of defect on the tubular member 102, which can be determined by the controller 158 based on the emitted and reflected signals 999 and 991, respectively.

In example aspects of the autonomous machine 150, the laser emitter-receivers 171 and 173 can move (for example, in tandem) on one or more tracks on the laser sensor plate 162. For example, the laser sensor plate 162 can include radial tracks 165a-165d, as well as linear tracks 169a-169f as shown in FIG. 2A. The radial tracks 165a from 165d have increasingly smaller circumferences as each track is located closer to a center 167 of the laser sensor plate 162. Thus, in this example, the radial track 165 can have a circumference that is similar or equal to a circumference of the laser sensor plate 162. During laser drift testing, the laser emitter-receivers 171 and 173 can move around one or more of the radial tracks 165a-165d to provide laser testing of the 360° radial surfaces (inner and outer) of the tubular member 102. In some aspects, the different radial tracks 165a-165d are sized to match or resemble particular tubular member circumferential sizes that are common.

As further shown in FIG. 2A, the laser emitter-receivers 171 and 173 can move (for example, in tandem) on linear tracks 169a-169f. In some aspects, the laser emitter-receivers 171 and 173 can move on one or more of the linear tracks 169a-169f in order to move from one radial track 165a-165d to another radial track 165a-165d (as the linear and radial tracks can be connected). As shown in FIG. 2A, two linear tracks 169a and 169c span the diameter of the laser sensor plate 162, with these linear tracks 169a and 169c being orthogonal to each other.

Therefore, the position of each of the laser emitter-receiver 171 and laser emitter-receiver 173 can be calibrated to fit an inner and outer diameter of the tubular member 102 prior to a start of the laser drift testing by the laser sensor plate 162. The laser emitter-receivers 171 and 173 can move on the radial tracks 165a-165d as well as the linear tracks 169a-169f to measure, for example, an ovality and wall thickness of the tubular member 102.

In some aspects, the laser emitter-receiver 171 can be a radial laser emitter-receiver 171, which generally rides on one of the radial tracks 165a-165d. The laser emitter-receiver 173 can be a linear laser emitter-receiver 173, which generally rides on one of the linear tracks 169a-169f. Although a single radial laser emitter-receiver 171 and single linear laser emitter-receiver 173 are shown, there can be multiple of each device without departing from the scope of this disclosure.

Figure 2B:
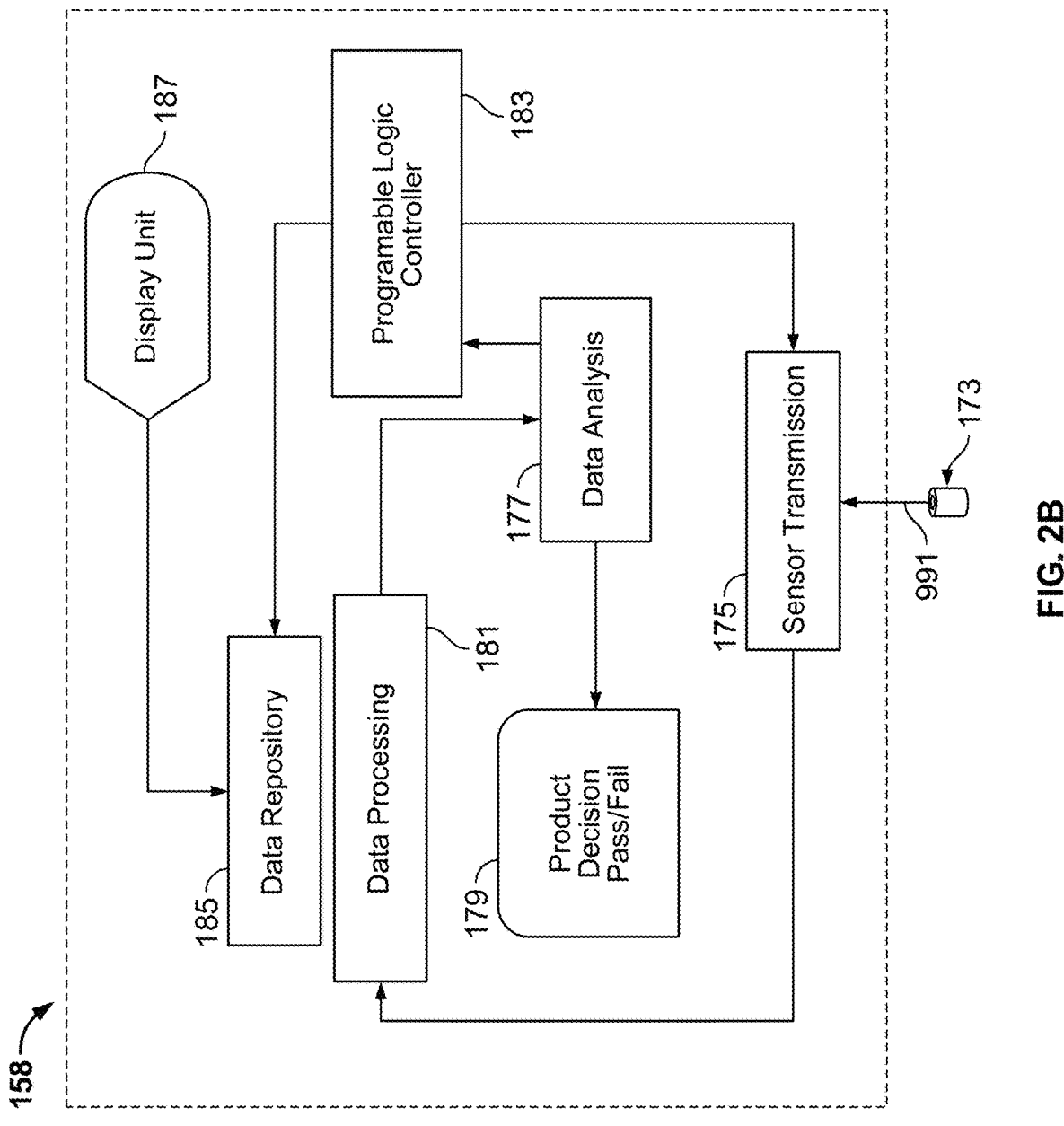
FIG. 2B is a schematic diagram of a controller of an example implementation of an autonomous machine that performs laser drift testing of one or more tubular members according to the present disclosure.

FIG. 2B is a schematic diagram of the controller 158 of an example implementation of the autonomous machine 150 that performs laser drift testing of one or more tubular members according to the present disclosure. This example implementation of the controller 158 includes, for example, a sensor transmission module 175 that receives, for example, the reflected laser signals 991 from the laser receiver 173. This sensor data can be provided to a data processing module 181, which processes the received laser reflections (for example, to remove noise or other inconsistencies). The processed sensor data can be provided to a data analysis module 177, which determines, for example, whether or not the processed laser reflection data indicates a defect or other abnormality in the tubular member 102. This determination of a defect or abnormality is provided to a production decision module 179, which determines if the tubular member 102 passes or fails the laser drift testing. In some aspects, the determination by the production decision module 179 can be made in combination with the tubular member data 111. For example, the tubular member data 111 can provide minimum and maximum defect thresholds for a particular tubular member 102. Thus, based on these thresholds (which can be different from one tubular member 102 to the next), a defect or abnormality determined by the data analysis module 177 may or may not cause the tubular member 102 to fail the testing.

As further shown in FIG. 2B, the determination of whether or not the processed laser reflection data indicates a defect or other abnormality in the tubular member 102 can be provided to a PLC 183. In some aspects, the PLC 183 can aggregate and further analyze the processed data and determinations and provide the additional data to a data repository 185. The data repository 185 can store, for example, acceptable drifting test criteria, acceptable measurement criteria for ovality, thickness, diameters, traceability marking, defects type, defects tolerance, drift test results, geometrical representations of cylindrical shapes used for drift test with jam/stuck locations if any, existing defects, defect measurements, defect locations, wall thickness by circumferential location, ovality measurements, maximum and minimum diameters, traceability marking results, pipe end geometry, defect geometry with dimensions, among other data. The stored data can be provided, for example, upon request, to a display unit 187 for display.

Figures 3A, 3B:
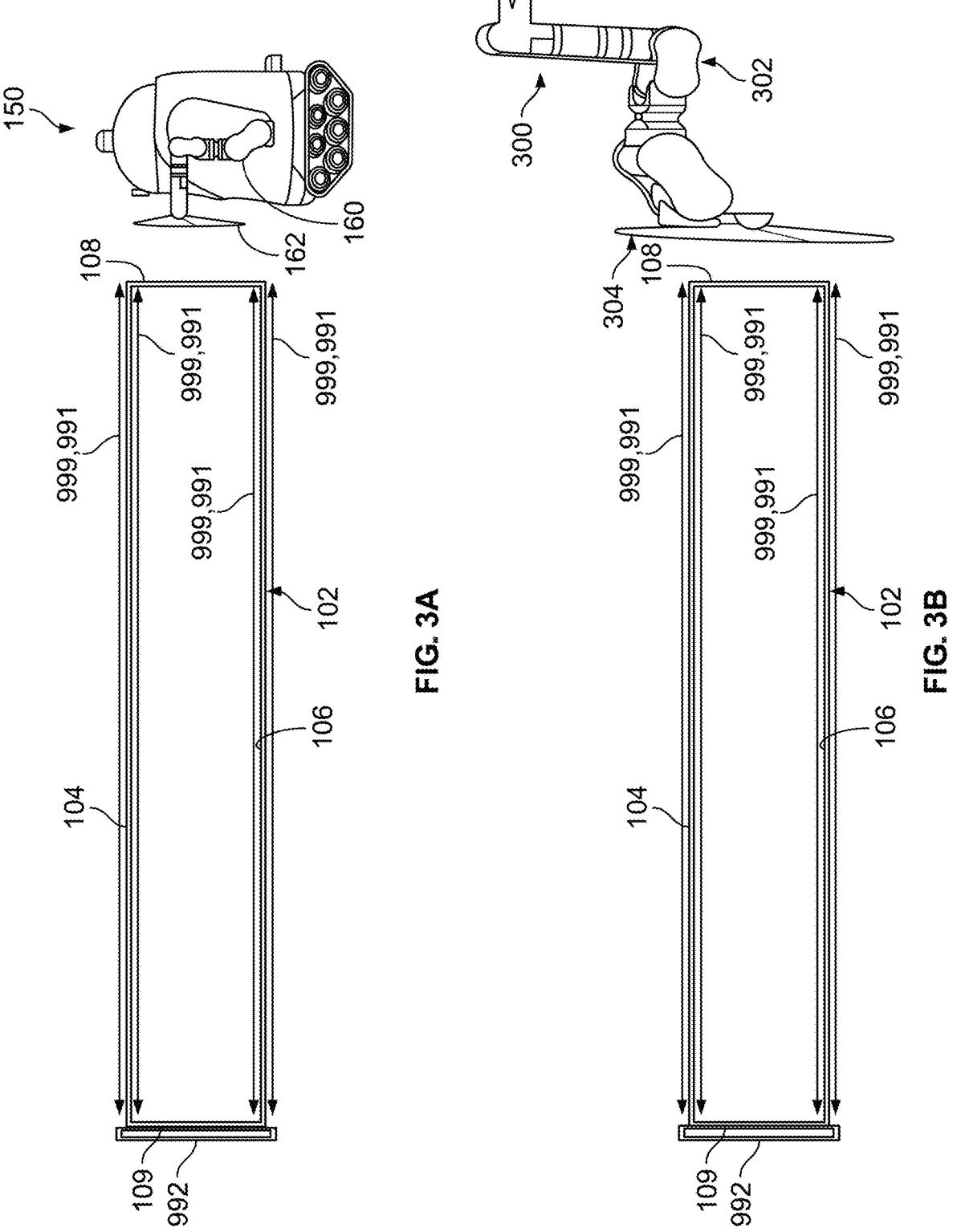
FIGS. 3A and 3B are schematic diagrams of example implementations of autonomous machines that perform laser drift testing of one or more tubular members according to the present disclosure.

FIGS. 3A and 3B are schematic diagrams of example implementations of autonomous machines that perform laser drift testing of one or more tubular members according to the present disclosure. Turning first to FIG. 3A, this figure shows the autonomous machine 150 positioned at the open end 108 of the tubular member 102. Here, the laser sensor plate 162 is positioned at the open end 108 (for example, by extending the arm 160) so that the emitted laser signal 999 can be transmitted along the tubular member 102. A laser reflector 992 is positioned at the other open end 109 of the tubular member 102. The laser reflector 992 receives the emitted laser signal 999 and reflects it as reflected laser signal 991. As shown in this example, the emitted laser signal 999 can be provided along the outer radial surface 104, while the reflected laser signal 991 is reflected back to the autonomous machine 150 along the inner radial surface 106.

During emission and reflection of the laser, the laser emitter-receivers 171 and 173 can be moved about the laser sensor plate 162 on one or more radial tracks 165a-165d as previous described, thereby providing laser signal 999 along the length of the tubular member 102 around a circumference (complete or substantially) of the tubular member 102. In some aspects, the laser sensor plate 162 can be adjusted and expanded to fit the tubular member size and the positions of the laser emitter-receivers 171 and 173 are calibrated to fit the inner and outer diameter of the tubular member 102 prior to the process described for the testing.

In example aspects, therefore, the process of laser drift testing as described with reference to FIG. 3A includes movement of the laser emitter-receivers 171 and 173 along the laser sensor plate 162 during operation (i.e., during emission and reflection of the laser signals). The laser emitter-receivers 171 and 173 rotate around the circumference of the tubular member 102 and send laser signals 999 through the entire pipe length, which are reflected by the laser reflector 992. In the case of any dent, defect, or out of tolerance dimension, the signals 999 and/or 991 will be deflected from the normal path and the laser emitter-receivers 171 and 173 will indicate the abnormal condition at a specific circumferential location (for example, 90 degrees, 150 degrees, etc.). This identification of the defect can be part of a qualitative step in the testing process.

In the case of a determination of an unacceptable test result in the qualitative step, a quantitative step in the process can also occur. For example, in a quantitative step, the laser sensor plate 162 can be moved into the tubular member 102 (for example, moved within a bore defined by the inner radial surface 106) and operated to quantify the determined defect. For instance, in the quantification step, an exact location, type, and dimensions of the defect can be determined by operation of one or both of the laser emitter-receivers 171 and 173. By riding the laser emitter-receivers 171 and 173 on one or more of the radial tracks 165a-165d and/or linear tracks 169a-169f within the bore and adjacent the inner radial surface 106, they can move in numerous degrees and angles to send emitted laser signals 999 (and collect received reflected laser signals 991) at angles largely orthogonal to the inner radial surface 106. This is in contrast to the emitted laser signals 999 and received reflected laser signals 991 in the qualitative step, which are largely parallel to the outer and inner radial surfaces 104 and 106, respectively.

Turning to FIG. 3B, an alternative autonomous machine 300 is shown in a process (for example, both qualitative and quantitative) for laser drift testing of a tubular member 102. As shown in this example, the autonomous machine 300 can comprise an extendable arm 302 formed of one or more linkages that extend, allowing the arm 302 to adjust between retracted and extended positions. A laser sensor plate 304 is coupled to the arm 302. Generally, the arm 302 can be similar to the extendable arm 160 (but can be larger or smaller depending on, for example, a size of the tubular member 102). Further, the laser sensor plate 304 can be similar to the laser sensor plate 162 (but also can be larger or smaller depending on, for example, a size of the tubular member 102). Qualitative and quantitative testing with the autonomous machine 300 can occur in a similar fashion as described with reference to the autonomous machine 150.

In some aspects, the autonomous machine 300 can be stationary, such as affixed to a stationary support surface (for example, wall or otherwise). In such examples, tubular members 102 may be moved (one by one, for instance) to the autonomous machine 300, which is stationary (but can still extend the arm 302 and operate the laser sensor plate 304 similar to the arm 160 and the laser sensor plate 162).

Figure 4A:
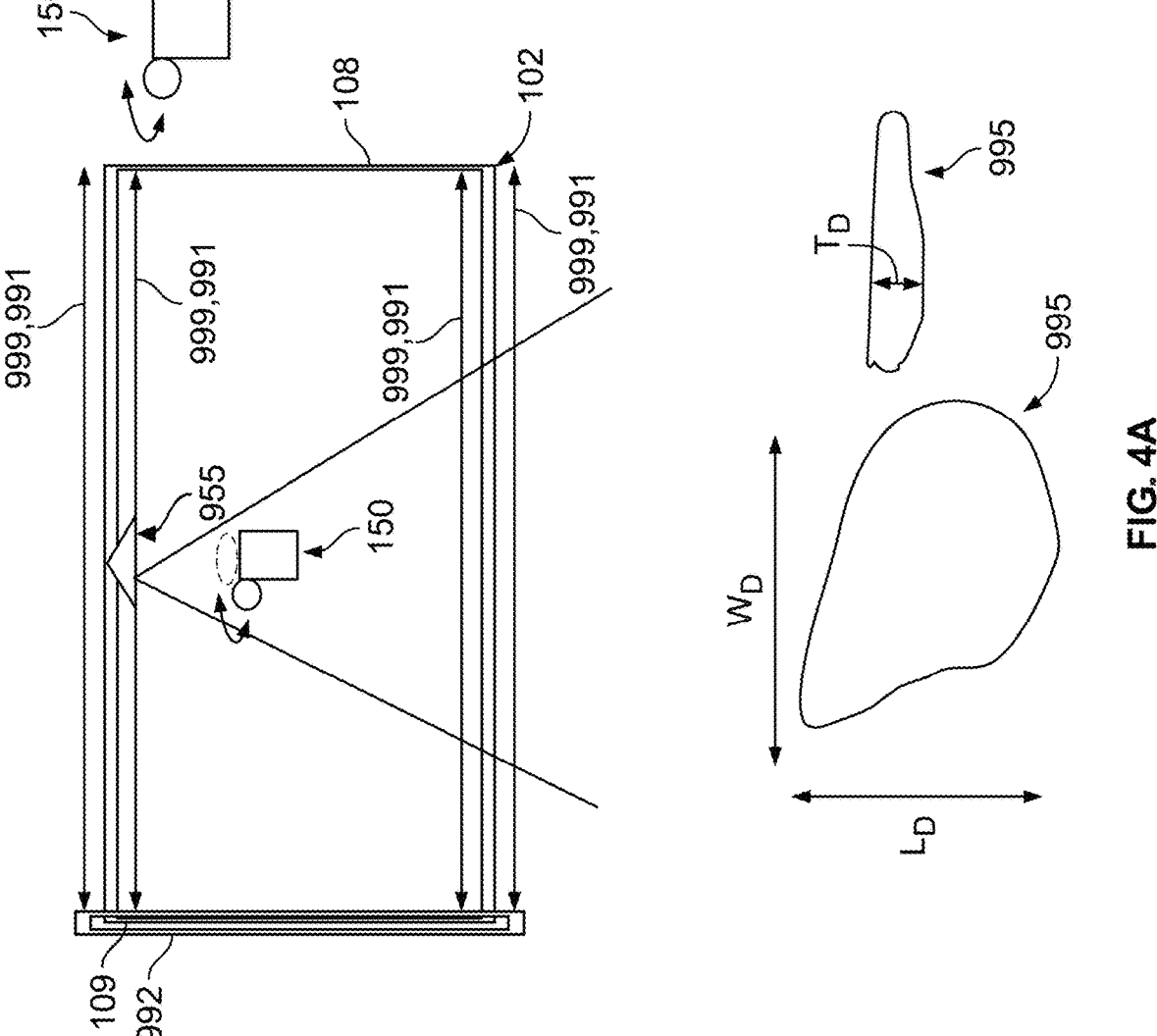
FIGS. 4A and 4B are schematic diagrams of an example testing process (and result thereof) performed by an example implementation of an autonomous machine during a laser drift testing process of a tubular member according to the present disclosure.
Figure 4B:
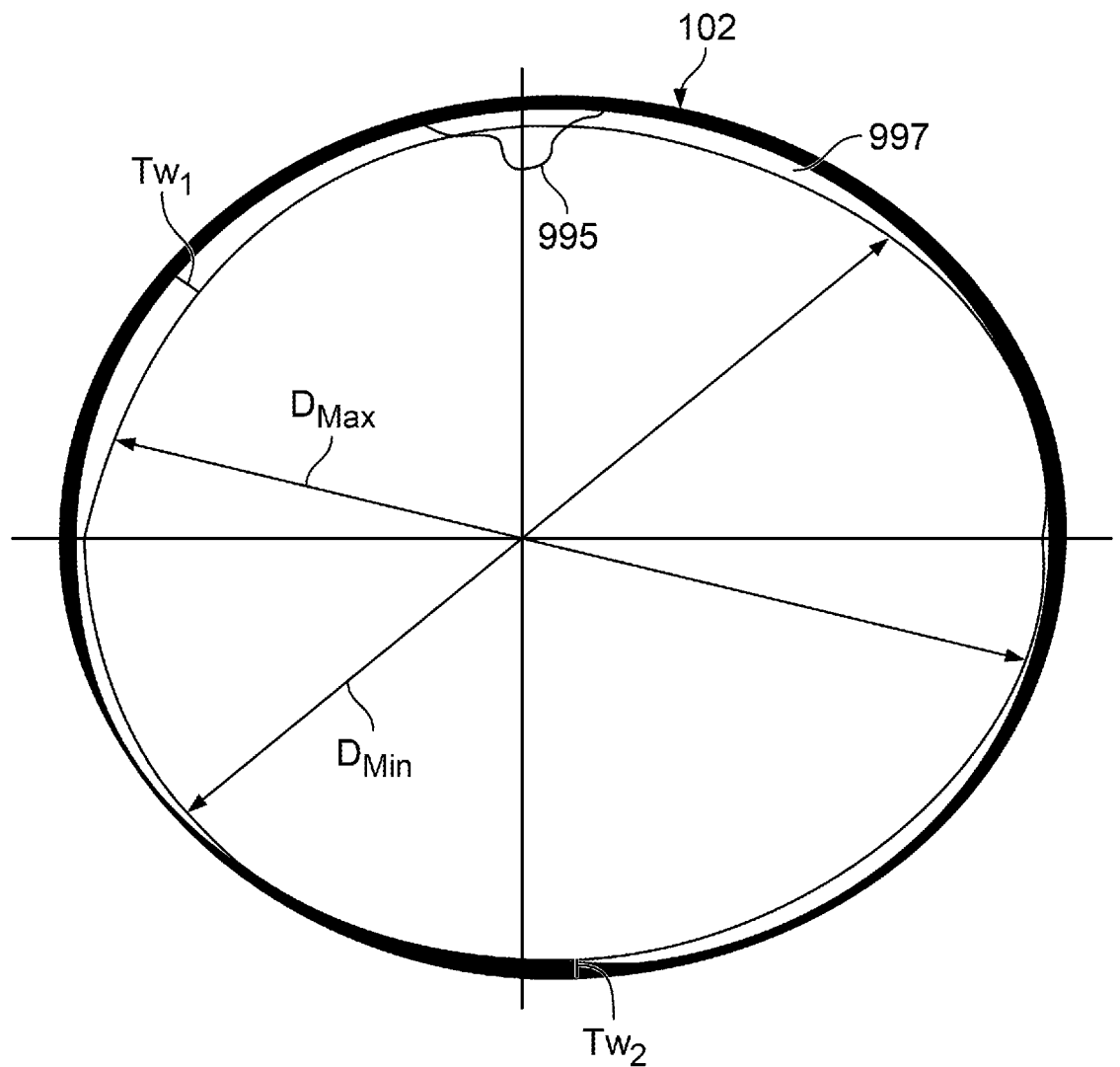

FIGS. 4A and 4B are schematic diagrams of an example testing process (and result thereof) performed by an example implementation of the autonomous machine 150 during a laser drift testing process of a tubular member according to the present disclosure. Turning to FIG. 4A, as shown here, a qualitative step in the process includes operation of the autonomous machine 150 with the laser sensor plate 162 positioned adjacent the open end 108 of the tubular member 102. Emitted laser signals 999 are transmitted largely in parallel to the tubular member 102 (and as the laser emitter-receivers 171 and 173 move, for example, circumferentially around the laser sensor plate 162). Reflected laser signals 991 (from the laser reflector 992) return in parallel fashion along the length of the tubular member 102 to the autonomous machine 150. Based on deflection of the reflected laser signals 991, a defect in the tubular member 102 (for example, defect in roundness or ovality, surface defect, or otherwise) can be qualitatively determined.

FIG. 4A further shows a schematic representation of the quantitative step. For instance, in this figure, the autonomous machine 150 is shown "inside" the tubular member 102, which represents the insertion of the laser sensor plate 162 (by, for example, extending the arm 160 into the tubular member 102). Emitted laser signals 999 (in this step) are transmitted largely orthogonal to the inner radial surface 106 of the tubular member 102 (and as the laser emitter-receivers 171 and 173 move, for example, linearly upon the laser sensor plate 162). Reflected laser signals 991 (from the laser reflector 992) return in orthogonal fashion from the inner radial surface 106 of the tubular member 102 to the autonomous machine 150.

As shown in FIG. 4A, a defect 995 is determined with the qualitative step, and further defined and quantified (for example, size and location) during the quantitative step. For example, the defect 995 can be quantified through a determination of a defect width, $W_D$, a defect length, $L_D$, and a defect thickness, $T_D$.

Other quantification can include, for example, a determination of a location, for example, at a position along a length of the tubular member 102 and at a position along a radial surface (inner or outer, or both) of the tubular member 102. For example, FIG. 4B shows a radial cross-sectional view of the tubular member 102 subsequent to the quantitative testing step. As shown in this example, the defect 995 is shown and determined to be an unacceptable defect, i.e., a defect that causes a determination of failure of the tubular member 102 as exceeding a maximum defect size. As another example, an out of tolerance ovality defect 997 was determined, which shows that the tubular member 102 is not perfectly round. As other examples, the quantitative analysis can determine varying wall thicknesses, $T_{W1}$ and $T_{W2}$, at two radial locations on the tubular member 102. As a further example, the quantitative analysis can determine a minimum inner diameter, $D_{min}$, and a maximum inner diameter, $D_{max}$, of the tubular member 102.

Figure 5:
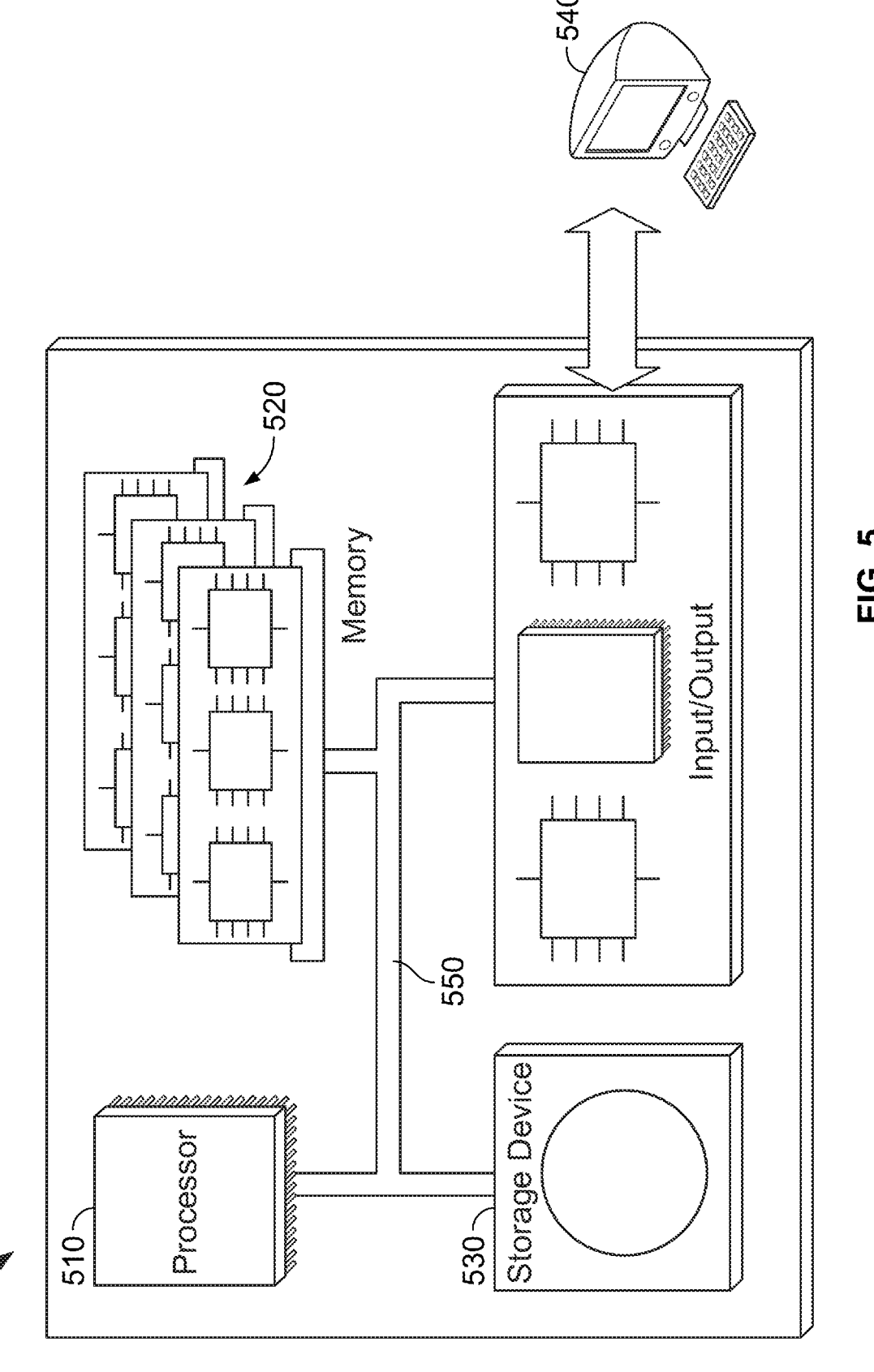
FIG. 5 shows a schematic drawing of a control system that can be used to control one or more operations associated with an autonomous machine described in the present disclosure.

FIG. 5 shows a schematic drawing of a control system 600 that can be used to implement one or more processes described in the present disclosure. Some or all of the example control system 500 can be implemented as part of the controller 158 of the autonomous machine 150. The control system (or controller) 500 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the control system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, a tape device, flash memory, a solid state device (SSD), or a combination thereof.

The input/output device 540 provides input/output operations for the controller 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. An autonomous machine, comprising:
   a body;
   a mobile base coupled to the body and configured to move the body between a plurality of locations adjacent respective first open ends of a plurality of tubular members; and
   at least one extendable appendage coupled to, and configured to extend from, the body, the at least one extendable appendage comprising at least one laser sensor plate, the at least one laser sensor plate comprising:
      at least one laser emitter configured to move on the at least one laser sensor plate and emit a laser signal through a particular first open end and along a first radial surface of a particular tubular member of the plurality of tubular members; and
      at least one laser receiver coupled to the at least one laser sensor plate and configured to receive, from a laser reflector positioned adjacent a second open end of the particular tubular member, a reflected laser signal along a second radial surface the particular tubular member, the emitted laser signal and the reflected laser signal indicative of a quality of the particular tubular member.

2. The autonomous machine of claim 1, wherein the mobile base comprises one or more tracks configured to move the body between the plurality of locations.

3. The autonomous machine of claim 1, wherein the at least one laser sensor plate comprises a plurality of tracks, and the at least one laser emitter and the at least one laser receiver are configured to ride on the plurality of tracks, the plurality of tracks comprising:
   a first track positioned or formed at or near an outer circumference of the at least one laser sensor plate; and
   a second track positioned or formed to connect a first location of the first track, across the at least one laser sensor plate, to a second location of the first track.

4. The autonomous machine of claim 3, wherein a length of the second track is a diameter of the at least one laser sensor plate.

5. The autonomous machine of claim 1, further comprising an electrical power system, comprising:
   at least one renewable power source coupled to the body and electrically coupled to the mobile base; and
   at least one charging port electrically coupled to the mobile base and a battery coupled to the body.

6. The autonomous machine of claim 1, further comprising a control system coupled within the body and configured to perform operations comprising:

receiving an optical image of the particular tubular member from one or more optical sensors communicably coupled to the control system;

based on the received optical image, controlling the mobile base to move the body to a first position of the plurality of positions, the first position located adjacent the first open end of the particular tubular member; and operating the at least one extendable appendage to move the at least one laser sensor plate to the first open end of the particular tubular member.

7. The autonomous machine of claim 6, wherein the operations comprise:

subsequent to moving the at least one laser sensor plate to the first open end of the particular tubular member, moving the at least one laser emitter around at least a portion of the at least one laser sensor plate while emitting the laser signal along the first radial surface of the particular tubular member;

moving the at least one laser receiver around at least the portion of the at least one laser sensor plate while emitting the laser signal along the first radial surface of the particular tubular member to receive the reflected laser signal; and based on the emitted laser signal and the reflected laser signal, determining the quality of the particular tubular member.

8. The autonomous machine of claim 7, wherein the operations comprise:

while emitting the laser signal along the tubular member, operating the at least one extendable appendage to move the at least one laser sensor plate into and through at least a portion of the particular tubular member such that the reflected laser signal reflects from the second radial surface of the particular tubular member.

9. The autonomous machine of claim 1, wherein the quality of the particular tubular member comprises at least one of a surface quality of the particular tubular member or a wall thickness of the particular tubular member.

10. A tubular member testing system, comprising:

a plurality of tubular members, each tubular member comprising an outer radial surface, an inner radial surface, a first open end, and a second open end;

a laser reflector positionable at or adjacent the first open end of each tubular member; and an autonomous machine, comprising:

a body;

a mobile base coupled to the body and configured to move the body between the second open ends of the plurality of tubular members; and at least one extendable appendage coupled to, and configured to extend from, the body, the at least one extendable appendage comprising at least one laser sensor plate, the at least one laser sensor plate comprising:

at least one laser emitter configured to move on the at least one laser sensor plate and emit a laser signal along one of the inner radial surface or the outer radial surface of each tubular member;

at least one laser receiver coupled to the at least one laser sensor plate and configured to receive a reflected laser signal from the laser reflector along the other of the inner radial surface of the outer radial surface of each tubular member; and a controller configured to perform operations comprising determining a quality of each tubular member based at least in part on the emitted laser signal and the reflected laser signal.

11. The tubular member testing system of claim 10, wherein the mobile base comprises one or more tracks configured to move the body between the second open ends of the plurality of tubular members.

12. The tubular member testing system of claim 10, wherein the at least one laser sensor plate comprises a plurality of tracks, and the at least one laser emitter and the at least one laser receiver are configured to ride on the plurality of tracks, the plurality of tracks comprising:

a first track positioned or formed at or near an outer circumference of the at least one laser sensor plate; and a second track positioned or formed to connect a first location of the first track, across the at least one laser sensor plate, to a second location of the first track.

13. The tubular member testing system of claim 12, wherein a length of the second track is a diameter of the at least one laser sensor plate.

14. The tubular member testing system of claim 10, wherein the autonomous machine further comprises an electrical power system, comprising:

at least one renewable power source coupled to the body and electrically coupled to the mobile base; and at least one charging port and electrically coupled to the mobile base and a battery coupled to the body.

15. The tubular member testing system of claim 10, wherein the operations comprise:

receiving an optical image of a particular tubular member from one or more optical sensors communicably coupled to the control system;

based on the received optical image, controlling the mobile base to move the body to the second open end of the particular tubular member; and operating the at least one extendable appendage to move the at least one laser sensor plate to the second open end of the particular tubular member.

16. The tubular member testing system of claim 15, wherein the operations comprise:

subsequent to moving the at least one laser sensor plate to the second open end of the particular tubular member, moving the at least one laser emitter around at least a portion of the at least one laser sensor plate while emitting the laser signal along the particular tubular member; and moving the at least one laser receiver around at least the portion of the at least one laser sensor plate while emitting the laser signal along the particular tubular member to receive the reflected laser signal.

17. The tubular member testing system of claim 16, wherein the operations comprise:

while emitting the laser signal along the particular tubular member, operating the at least one extendable appendage to move the at least one laser sensor plate into and through at least a portion of the particular tubular member such that the reflected laser signal reflects from the inner radial surface of the particular tubular member.

18. The tubular member testing system of claim 17, wherein the quality of the particular tubular member comprises at least one of a surface quality of the particular tubular member or a wall thickness of the particular tubular member.

19. The tubular member testing system of claim 10, wherein the plurality of tubular members comprises well-bore tubular members.

20. A method for testing a tubular member, comprising:

activating an autonomous machine that comprises:

a body;

a mobile base coupled to the body; and at least one extendable appendage coupled to the body, the at least one extendable appendage comprising at least one laser sensor plate that comprises:

at least one laser emitter; and at least one laser receiver;

moving the autonomous machine to a first open end of a particular tubular member of a plurality of tubular members with the mobile base;

operating the at least one laser emitter to emit a laser signal along a first radial surface of the particular tubular member;

receiving, from a laser reflector positioned adjacent a second open end of the particular tubular member, a reflected laser signal along a second radial surface of the particular tubular member opposite the first radial surface with the at least one laser receiver; and based on the emitted laser signal and the reflected laser signal, determining a quality of the particular tubular member.

21. The method of claim 20, wherein moving the autonomous machine comprises moving the autonomous machine with one or more tracks on the mobile base.

22. The method of claim 20, comprising:

moving the at least one laser emitter and the at least one laser receiver on a plurality of tracks of the at least one laser sensor plate during emission of the laser signal and receipt of the reflected laser signal.

23. The method of claim 22, wherein moving the at least one laser emitter and the at least one laser receiver on the plurality of tracks comprises at least one of:

moving the at least one laser emitter and the at least one laser receiver on a first track positioned or formed at or near an outer circumference of the at least one laser sensor plate; or moving the at least one laser emitter and the at least one laser receiver on a second track positioned or formed to connect a first location of the first track, across the at least one laser sensor plate, to a second location of the first track.

24. The method of claim 20, comprising providing electrical power to the mobile base with at least one of:

at least one renewable power source electrically coupled to the mobile base; or at least one battery electrically coupled to the mobile base.

25. The method of claim 20, comprising:

identifying an optical image of the particular tubular member from one or more optical sensors;

based on the optical image, controlling the mobile base to move the body to a first position located adjacent the first open end of the particular tubular member; and operating the at least one extendable appendage to move the at least one laser sensor plate to the first open end of the particular tubular member.

26. The method of claim 25, comprising:

subsequent to moving the at least one laser sensor plate to the first open end of the particular tubular member, moving the at least one laser emitter around at least a portion of the at least one laser sensor plate while emitting the laser signal along the first radial surface of the particular tubular member;

moving the at least one laser receiver around at least the portion of the at least one laser sensor plate while emitting the laser signal along the first radial surface of the particular tubular member to receive the reflected laser signal; and based on the emitted laser signal and the reflected laser signal, determining the quality of the particular tubular member.

27. The method of claim 26, comprising:

while emitting the laser signal along the particular tubular member, operating the at least one extendable appendage to move the at least one laser sensor plate into and through at least a portion of the particular tubular member such that the reflected laser signal reflects from the second radial surface of the particular tubular member.

28. The method of claim 25, comprising:

scanning, with the one or more optical sensors, a code on the particular tubular member associated with one or more parameters of the particular tubular member; and displaying, on a visual display of the autonomous machine, at least one of: the code, or the one or more parameters of the particular tubular member.

29. The method of claim 28, wherein determining the quality of the particular tubular member comprises determining the quality based on at least one of the one or more parameters of the particular tubular member.

30. The method of claim 20, wherein determining the quality of the tubular member comprises determining at least one of a surface quality of the particular tubular member or a wall thickness of the particular tubular member.

\* \* \* \* \*